(12) United States Patent
Ophir et al.

(10) Patent No.: US 12,518,642 B2
(45) Date of Patent: Jan. 6, 2026

(54) SYSTEMS AND METHODS FOR LANDING AND TERRAIN FLIGHT ASSISTANCE

(71) Applicant: Elbit Systems Ltd., Haifa (IL)

(72) Inventors: Yoav Ophir, Haifa (IL); Ayelet Mashiah, Haifa (IL)

(73) Assignee: Elbit Systems Ltd., Haifa (IL)

( * ) Notice: Subject to any disclaimer, the term of this patent is extended or adjusted under 35 U.S.C. 154(b) by 235 days.

(21) Appl. No.: 18/062,898

(22) Filed: Dec. 7, 2022

(65) Prior Publication Data

US 2023/0105148 A1  Apr. 6, 2023

Related U.S. Application Data

(63) Continuation of application No. PCT/IL2021/050679, filed on Jun. 7, 2021.

(30) Foreign Application Priority Data

Jun. 8, 2020 (IL) .......................................... 275198

(51) Int. Cl.
| | |
|---|---|
| G08G 5/54 | (2025.01) |
| B64D 45/08 | (2006.01) |
| G08G 5/21 | (2025.01) |
| G08G 5/74 | (2025.01) |

(52) U.S. Cl.
CPC ............... *G08G 5/54* (2025.01); *B64D 45/08* (2013.01); *G08G 5/21* (2025.01); *G08G 5/74* (2025.01)

(58) Field of Classification Search
None
See application file for complete search history.

(56) References Cited

U.S. PATENT DOCUMENTS

| | | | |
|---|---|---|---|
| 7,642,929 B1 | 1/2010 | Pinkus | |
| 9,613,420 B2 | 4/2017 | Tamaazousti | |
| 11,210,851 B1* | 12/2021 | Nussbaum | ............ H04W 4/021 |
| 2013/0321392 A1* | 12/2013 | van der Merwe | ... G06V 20/176 |
| | | | 345/419 |

(Continued)

FOREIGN PATENT DOCUMENTS

WO   WO-2017115365 A1 *   7/2017   ........... G02B 27/017

OTHER PUBLICATIONS

International Search Report for PCT Application No. PCT/IL2021/050679, mailed on Oct. 7, 2021.

(Continued)

*Primary Examiner* — Jelani A Smith
*Assistant Examiner* — Davin Seol
(74) *Attorney, Agent, or Firm* — PEARL COHEN ZEDEK LATZER BARATZ LLP

(57) ABSTRACT

A method and a system for landing and terrain flight assistance are provided herein. The method may include the following steps: obtaining, by at least one imaging sensor disposed on an aerial platform, at least two images of at least a portion of a specified region of a terrain; determining, based on the at least two images, a 3D model of at least a portion of the specified region; receiving a predetermined model of at least a portion of the specified region; determining a real-world geographic location of the aerial platform based on the 3D model and the predetermined model; and determining flight instructions based on the 3D model and the determined geographic location of the aerial platform.

16 Claims, 6 Drawing Sheets

(56) References Cited

U.S. PATENT DOCUMENTS

| | | |
|---|---|---|
| 2015/0292888 A1 | 10/2015 | Haglund |
| 2016/0114905 A1* | 4/2016 | Derenick ............... G08G 5/025 |
| | | 701/16 |
| 2016/0306363 A1 | 10/2016 | Wang |
| 2018/0107211 A1* | 4/2018 | Schubert .............. G01C 21/005 |
| 2018/0158345 A1* | 6/2018 | Hiddai ................ G08G 5/0052 |
| 2019/0248487 A1 | 8/2019 | Holtz |
| 2019/0355266 A1 | 11/2019 | Cross |
| 2020/0012106 A1* | 1/2020 | Shpunt ............... G02B 27/0172 |
| 2023/0092896 A1* | 3/2023 | Zuckerman ............ G05D 1/101 |
| | | 705/338 |

OTHER PUBLICATIONS

Office action for Israel Patent Application No. 275198, mailed on Dec. 23, 2020.

* cited by examiner

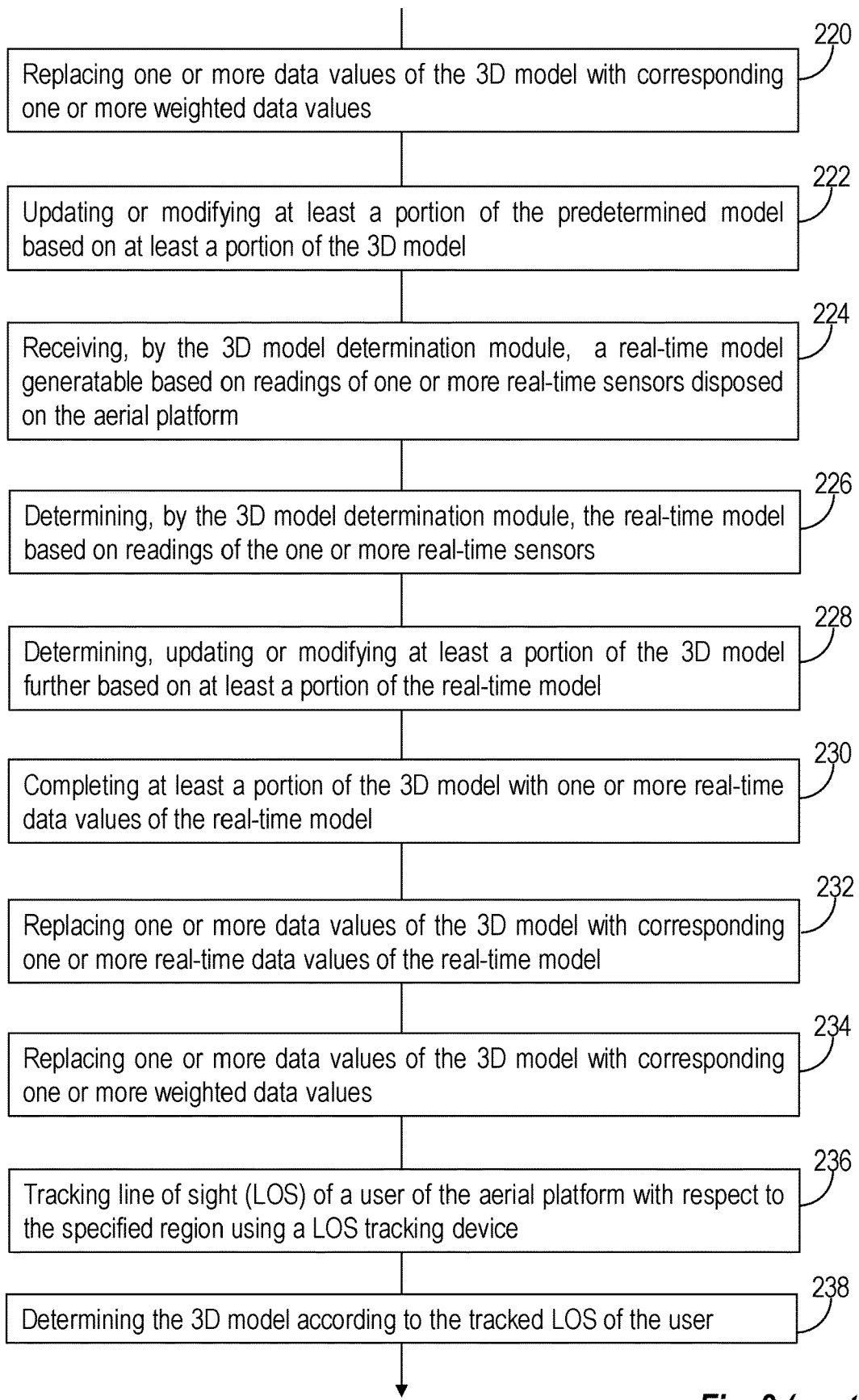
Fig. 2 (cont. 1)

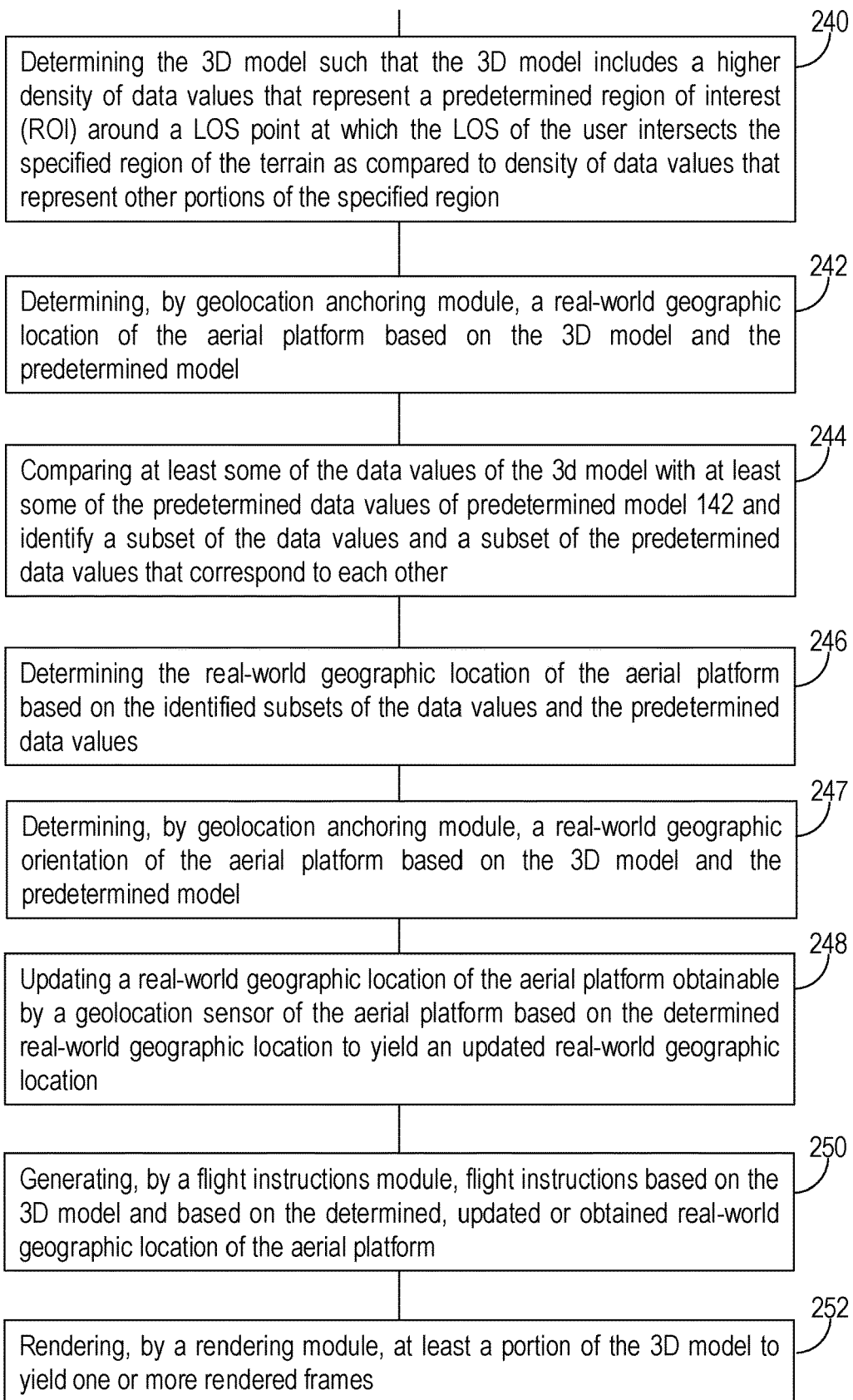
Fig. 2 (cont. 2)

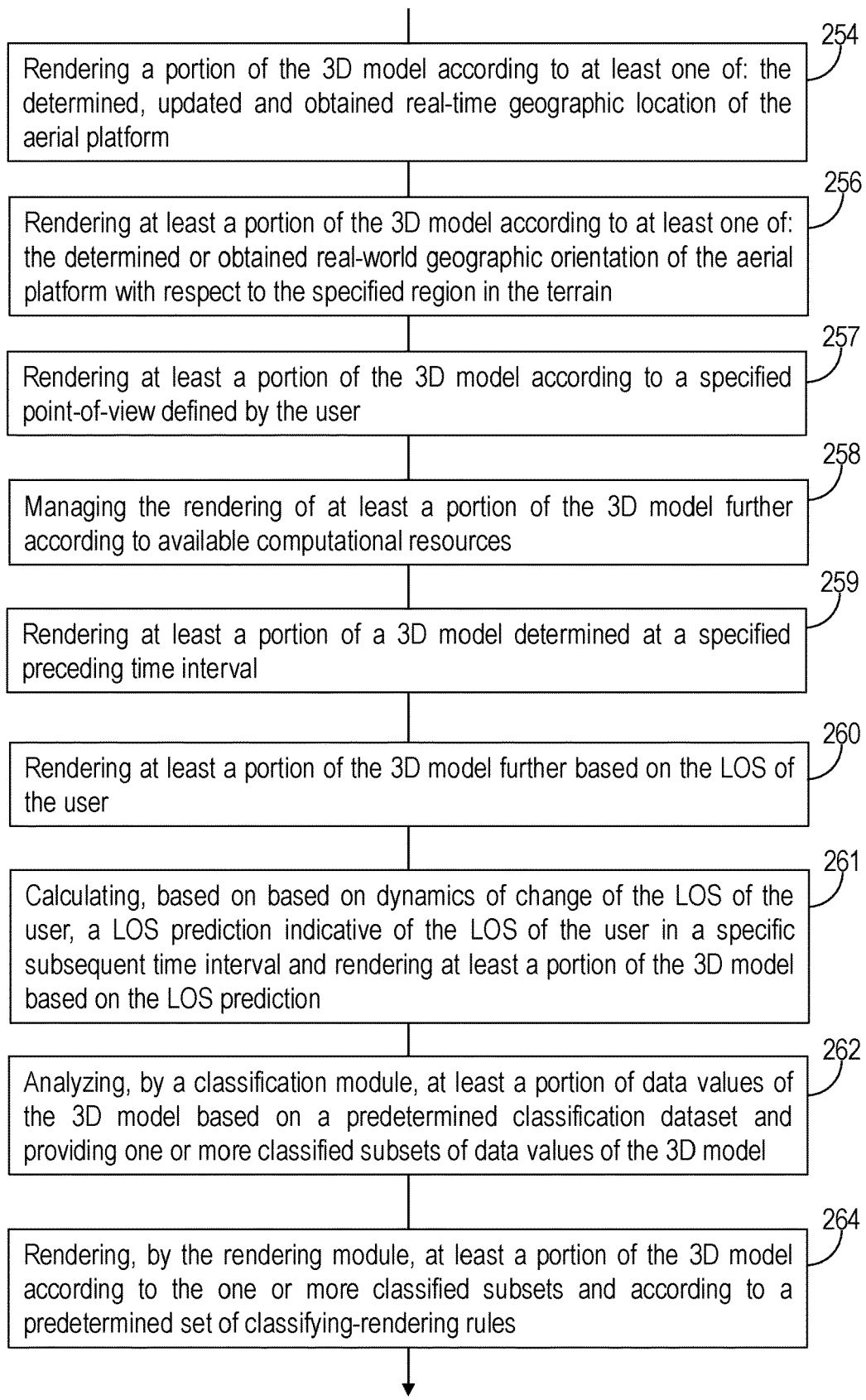
Fig. 2 (cont. 3)

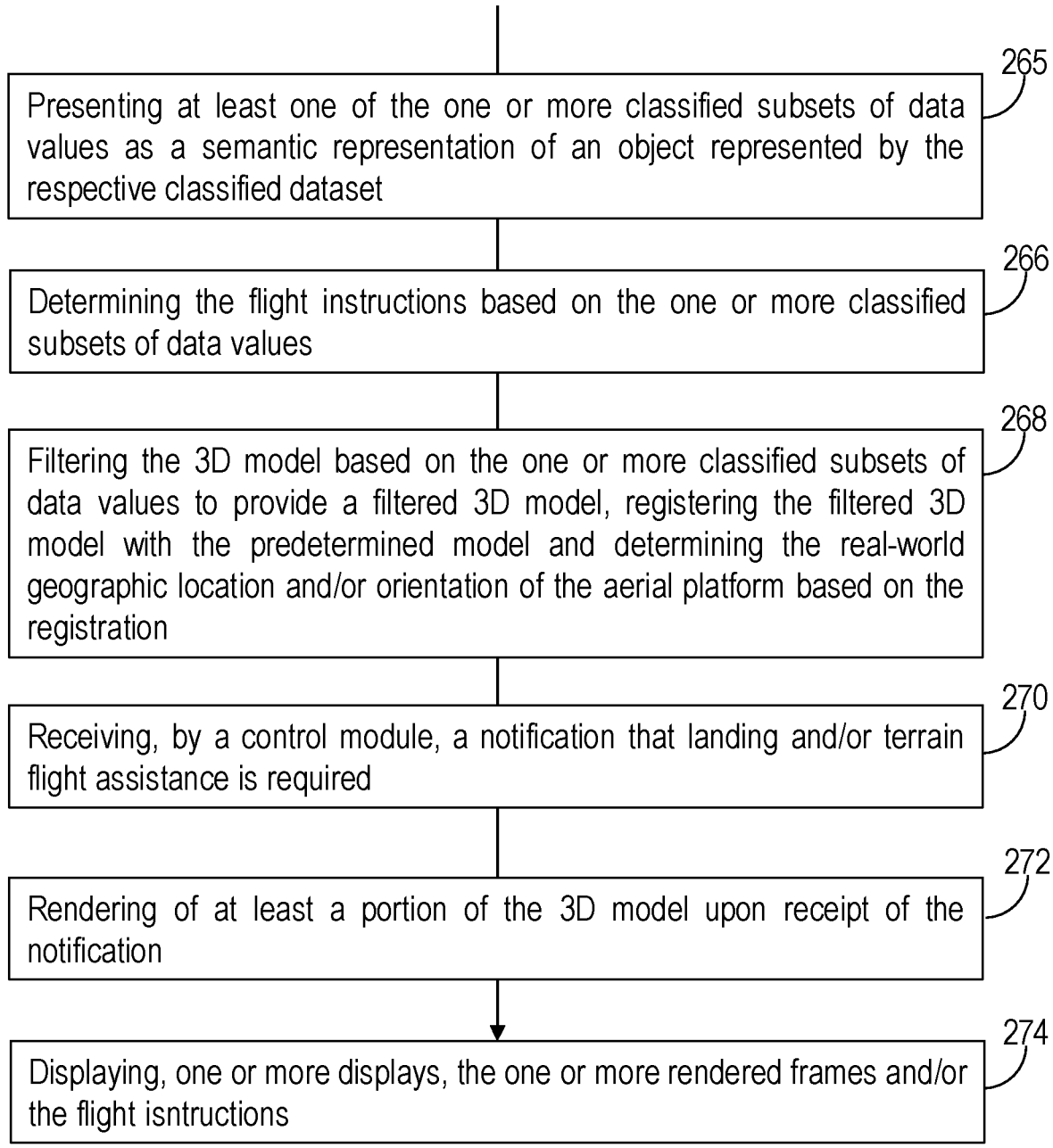
*Fig. 2 (cont. 4)*

SYSTEMS AND METHODS FOR LANDING AND TERRAIN FLIGHT ASSISTANCE

CROSS-REFERENCE TO RELATED APPLICATION

This Application is a continuation of PCT Application No. PCT/IL2021/050679, filed on Jun. 7, 2021, which claims the benefit of and priority to Israeli Patent Application No. 275198, filed on Jun. 8, 2020, both are incorporated herein by reference in their entirety and are co-owned by the Assignee of the instant application.

FIELD OF THE INVENTION

The present invention relates to the field of systems and methods for landing and terrain flight assistance, and more particularly, to systems and methods utilizing at least one passive sensor thereof.

BACKGROUND OF THE INVENTION

Some current system for landing assistance and/or for terrain flight assistance for aerial platforms may utilize active sensors (such as radar, LIDAR, etc.) for generating three-dimensional (3D) models of landing sites and/or of terrains. The 3D models thereof may enable landing and/or terrain flight, for example under reduced visibility conditions. However, utilization of active sensors may, for example, reveal a location of the aerial platform.

SUMMARY OF THE INVENTION

Some embodiments of the present invention may provide a method of landing and terrain flight assistance, the method may include: obtaining, by at least one imaging sensor disposed on an aerial platform, at least two images of at least a portion of a specified region of a terrain when the aerial platform is at corresponding at least two different geographic locations; determining, based on the at least two images, a 3D model includes a set of data values that provide a 3D representation of at least a portion of the specified region; receiving a predetermined model includes a set of predetermined data values that provide a representation of at least a portion of the specified region, wherein real-world geographic locations of at least some of the predetermined data values are known; determining a real-world geographic location of the aerial platform based on the 3D model and the predetermined model; and determining flight instructions based on the 3D model and the determined real-world geographic location of the aerial platform.

Some embodiments may include obtaining at least one of the at least two images at a different orientation with respect to the specified region as compared to at least one another image of the at least two images.

Some embodiments may include updating at least a portion of the 3D model based on at least a portion of the predetermined model.

In some embodiments, the updating may include at least one of: completing one or more missing data values of the 3D model with one or more predetermined data values of the predetermined model; replacing one or more data values of the 3D model with corresponding one or more predetermined data values of the predetermined model; and replacing one or more data values of the 3D model with corresponding one or more weighted data values, each of the weighted data values includes corresponding weighted data value of the 3D model and corresponding weighted predetermined data value of the predetermined model.

In some embodiments, the replacing is upon detection of a reduction of a quality of the one or more data values of the 3D model.

Some embodiments may include updating at least a portion of the predetermined model based on at least a portion of the 3D model.

Some embodiments may include: receiving a real-time model generatable based on readings of one or more real-time sensors disposed on the aerial platform, the real-time model includes a set of real-time data values that provide a representation of at least a portion of the specified region; and updating at least a portion of the 3D model based on at least a portion of the real-time model.

In some embodiments, the one or more real-time sensors includes at least one of a radar and LIDAR.

In some embodiments, the updating may include at least one of: completing one or more missing data values of the 3D model with one or more real-time data values of the real-time model; replacing one or more data values of the 3D model with corresponding one or more real-time data values of the real-time model; and replacing one or more data values of the 3D model with corresponding one or more weighted data values, each of the weighted data values includes corresponding weighted data value of the 3D model and corresponding weighted real-time data value of the real-time model.

In some embodiments, the replacing is upon detection of a reduction of a quality of the one or more data values of the 3D model.

Some embodiments may include tracking a line of sight (LOS) of a user of the aerial platform with respect to the specified region using a LOS tracking device; and determining the 3D model according to the tracked LOS of the user.

Some embodiments may include determining the 3D model to include a higher density of data values that represent a predetermined region of interest (ROI) around a LOS point at which the LOS of the user intersects the specified region of the terrain as compared to density of data values that represent other portions of the specified region.

Some embodiments may include rendering at least a portion of the 3D model to yield one or more rendered frames.

Some embodiments may include rendering at least a portion of the 3D model according to at least one of: the determined real-world geographic location of the aerial platform; and a specified point-of-view defined by a user.

Some embodiments may include tracking a line of sight (LOS) of a user of the aerial platform with respect to the specified region using a LOS tracking device; calculating, based on dynamics of change of the LOS of the user, a LOS prediction indicative of the LOS of the user in a subsequent time interval; and rendering at least a portion of the 3D model based on the LOS prediction.

Some embodiments may include rendering at least a portion of a 3D model that has been determined at a specified preceding time interval.

Some embodiments may include analyzing at least a portion of data values of the 3D model based on a predetermined classification dataset to provide one or more classified subsets of data values of the 3D model.

Some embodiments may include rendering at least a portion of the 3D model according to the one or more classified subsets and according to a predetermined set of classifying-rendering rules to provide one or more rendered frames.

Some embodiments may include presenting at least one of the one or more classified subsets of data values as a semantic representation of an object represented by the respective classified dataset.

Some embodiments may include determining the flight instructions based on the one or more classified subsets of data values.

Some embodiments may include: filtering the 3D model based on the one or more classified subsets of data values to provide a filtered 3D model, the filtered 3D model contains data values relating to at least one of the terrain and permanent objects within the specified region; registering the filtered 3D model with the predetermined model; and determining the real-world geographic location of the aerial platform based on the registration.

Some embodiments may include displaying on one or more displays at least one of at least one of the one or more rendered frames and the flight instructions.

Some embodiments of the present invention may provide a system for landing and terrain flight assistance, the system may include: one or more imaging sensors adapted to be disposed on an aerial platform and adapted to obtain at least two images of at least a portion of a specified region of a terrain when the aerial platform is at corresponding at least two different geographic locations; and a processing unit configured to: receive the at least two images; determine, based on the at least two images, a 3D model includes a set of data values that provide a 3D representation of at least a portion of the specified region; receive a predetermined model includes a set of predetermined data values that provide a representation of at least a portion of the specified region, real-world geographic locations of at least some of the predetermined data values are known; determine a real-world geographic location of the aerial platform based on the 3D model and the predetermined model; and determine flight instructions based on the 3D model and the determined real-world geographic location of the aerial platform.

In some embodiments, the one or more imaging sensors is further adapted to obtain at least one of the at least two images at a different orientation with respect to the specified region as compared to at least one another image of the at least two images.

In some embodiments, the processing unit is configured to update at least a portion of the 3D model based on at least a portion of the predetermined model.

In some embodiments, the processing unit is configured to perform at least one of the following functions to update at least a portion of the 3D model: complete one or more missing data values of the 3D model with one or more predetermined data values of the predetermined model; replace one or more data values of the 3D model with corresponding one or more predetermined data values of the predetermined model; and replace one or more data values of the 3D model with corresponding one or more weighted data values, each of the weighted data values includes corresponding weighted data value of the 3D model and corresponding weighted predetermined data value of the predetermined model.

In some embodiments, the processing unit is configured to replace the one or more data values of the 3D model upon detection of a reduction of a quality of the one or more data values thereof.

In some embodiments, the processing unit is configured to update at least a portion of the predetermined model based on at least a portion of the 3D model.

In some embodiments, the processing unit is configured to: receive a real-time model generatable based on readings of one or more real-time sensors disposed on the aerial platform, the real-time model includes a set of real-time data values that provide a representation of at least a portion of the specified region; and update at least a portion of the 3D model based on at least a portion of the real-time model.

In some embodiments, the one or more real-time sensors includes at least one of a radar and LIDAR.

In some embodiments, the processing unit is configured to perform at least one of the following functions to update at least a portion of the 3D model: completing one or more missing data values of the 3D model with one or more real-time data values of the real-time model; replacing one or more data values of the 3D model with corresponding one or more real-time data values of the real-time model; and replacing one or more data values of the 3D model with corresponding one or more weighted data values, each of the weighted data values includes corresponding weighted data value of the 3D model and corresponding weighted real-time data value of the real-time model.

In some embodiments, the processing unit is configured to replace the one or more data values of the 3D model upon detection of a reduction of a quality of the one or more data values thereof.

In some embodiments, the system may include a LOS tracking device configured to track a line of sight (LOS) of a user of the aerial platform with respect to the specified region, and wherein the processing unit is configured to determine the 3D model according to the tracked LOS of the user.

In some embodiments, the processing unit is configured to determine the 3D model to include a higher density of data values that represent a predetermined region of interest (ROI) around a LOS point at which the LOS of the user intersects the specified region of the terrain as compared to density of data values that represent other portions of the specified region.

In some embodiments, the processing unit is configured to render at least a portion of the 3D model to yield one or more rendered frames.

In some embodiments, the processing unit is configured to render at least a portion of the 3D model according to at least one of: the determined at least one of real-world geographic location and real-world geographic orientation of the aerial platform with respect to the specified region in the terrain; and a specified point-of view defined by a user.

In some embodiments, the system may include a LOS tracking device configured to track a line of sight (LOS) of a user of the aerial platform with respect to the specified region, and wherein the processing unit is configured to: calculate, based on dynamics of change of the LOS of the user, a LOS prediction indicative of the LOS of the user in a subsequent time interval; and render at least a portion of the 3D model based on the LOS prediction.

In some embodiments, the processing unit is configured to render at least a portion of a 3D model that has been determined at a specified preceding time interval.

In some embodiments, the processing unit is configured to analyze at least a portion of data values of the 3D model based on a predetermined classification dataset to provide one or more classified subsets of data values of the 3D model.

In some embodiments, the processing unit is configured to render at least a portion of the 3D model according to the one or more classified subsets and according to a predetermined set of classifying-rendering rules to provide one or more rendered frames.

In some embodiments, the processing unit is configured to present at least one of the one or more classified subsets of data values as a semantic representation of an object represented by the respective classified dataset.

In some embodiments, the processing unit is configured to determine the flight instructions based on the one or more classified subsets of data values.

In some embodiments, the processing unit is configured to: filter the 3D model based on the one or more classified subsets of data values to provide a filtered 3D model, the filtered 3D model contains data values relating to at least one of the terrain and permanent objects within the specified region; register the filtered 3D model with the predetermined model; and determine at least one of the real-world geographic location and the real-world geographic orientation of the aerial platform based on the registration.

In some embodiments, the processing unit is configured to display on one or more displays at least one of: at least one of the one or more rendered frames and the flight instructions.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
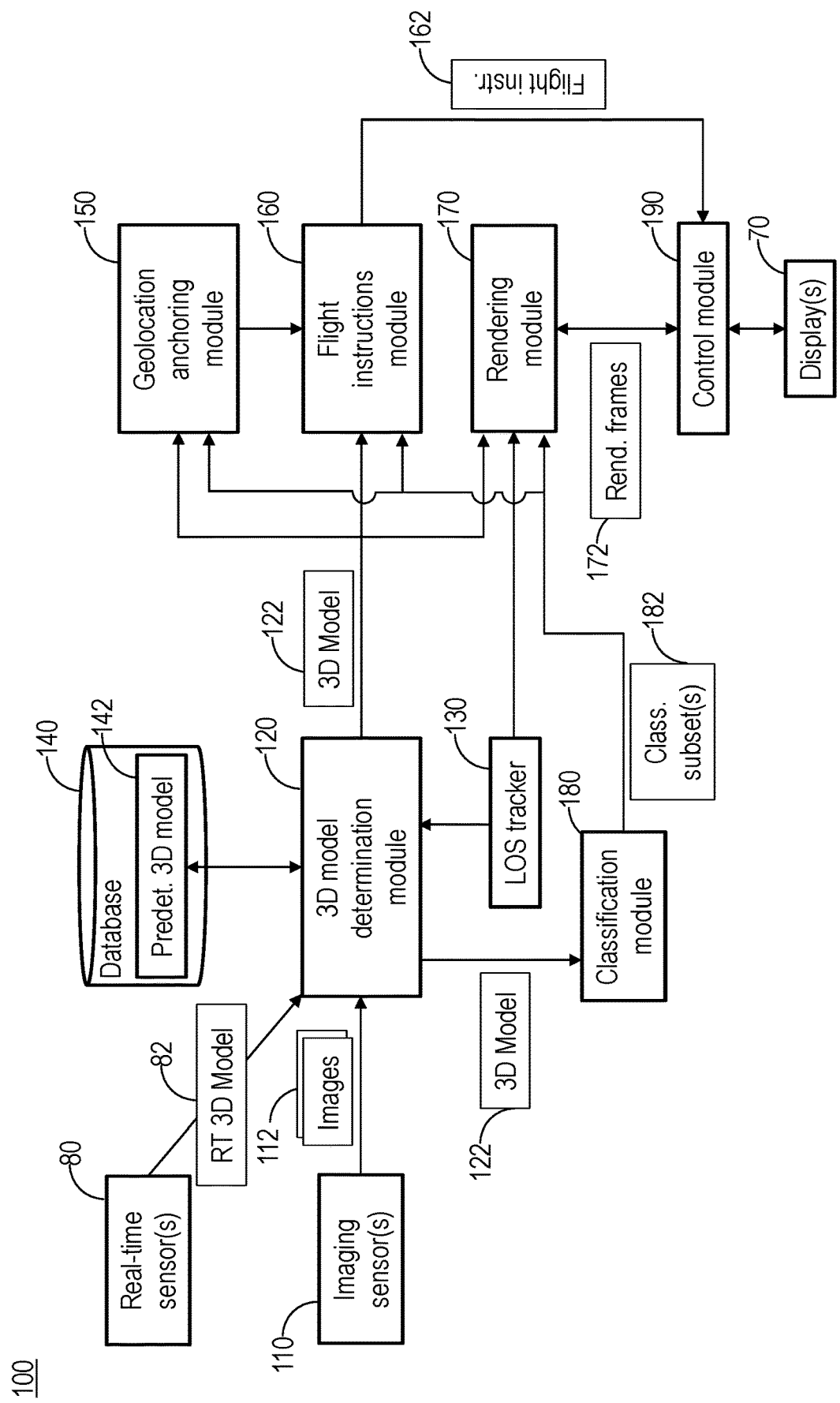
FIG. 1 is a schematic block diagram of a system for landing and terrain flight assistance, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Reference is now made to FIG. 1, which is a schematic block diagram of a system 100 for landing and terrain flight assistance, according to some embodiments of the invention.

According to some embodiments, system 100 may include at least one imaging sensor 110. Imaging sensor(s) 110 may be adapted to be disposed on an aerial platform. The aerial platform may, for example, be a helicopter, an airplane, a drone, etc. Imaging sensor(s) 110 may be disposed on, for example, a front of the aerial vehicle such that imaging sensor(s) 110 may face (or substantially face) a direction of flight of the aerial platform.

In some embodiments, imaging sensor(s) 110 may be panoramic sensor(s). In some embodiments, imaging sensor(s) 110 may be wide field-of-view sensor(s). In some embodiments, imaging sensor(s) 110 may be narrow field-of-view sensor(s). In some embodiments, imaging sensor(s) 110 may be gimbaled sensor(s).

Imaging sensor(s) 110 may be passive sensor(s). In some embodiments, imaging sensor(s) 110 may operate in at least one of: NIR, SWIR, MWIR, LWIR, visible range and any combination thereof.

Imaging sensor(s) 110 may obtain at least two images 112 of at least a portion of a specified region of a terrain. At least two images 112 may be obtained by imaging sensor(s) 110 at corresponding at least two different geographic locations during a flight of the aerial platform. In some embodiments, at least one of at least two images 112 may be obtained at a different orientation with respect to the specified region as compared to other images of at least two images 112.

According to some embodiments, system 100 may include a 3D model determination module 120. 3D model determination module 120 may be in communication with imaging sensor(s) 110. 3D model determination module 120 may receive at least two images 112 from imaging sensor(s) 110.

3D model determination module 120 may determine a 3D model 122 of at least a portion of the specified region of the terrain based on at least two images 112. In some embodiments, 3D model 122 may include a set of data values that may provide a 3D representation of at least a portion of the specified region.

According to some embodiments, system 100 may include a database 140. Database 140 may include a predetermined model 142 of at least a portion of the terrain. The portion of the terrain may, for example, include the specified region of the terrain for which 3D model 122 is being determined, or at least a portion thereof.

Predetermined model 142 may include one or more sets of predetermined data values. The set(s) of predetermined data values may provide a representation of at least a portion of the specified region. In some embodiments, a real-world geographic location of at least some of the predetermined data values may be known.

In some embodiments, predetermined model 142 may include one or more predetermined 3D datasets that may provide a 3D representation of at least a portion of the specified region. For example, predetermined model 142 may include Digital Terrain Elevation Data (DTED), a Digital Elevation Model (DEM), 3D model (like 3D model 122) that has been determined by another aerial platform, etc. In some embodiments, predetermined model 142 may include one or more predetermined two-dimensional (2D) datasets that may provide a 2D representation of at least a portion of the specified region. For example, predetermined model may include satellite images of at least a portion of the specified region, etc. It is noted that predetermined model 142 may include other models/datasets as well. In some embodiments, predetermined model 142 may include one or more predetermined 3D datasets and one or more predetermined two-dimensional (2D) datasets.

According to various embodiments, 3D model determination module 120 may determine, update or modify at least a portion of 3D model 122 further based on at least a portion of predetermined model 142.

In some embodiments, at least a portion of 3D model 122 may be completed with one or more predetermined data values of predetermined model 142. For example, if 3D model 122 determined based on images 112 is missing one or more data values that should represent a portion of the specified region (e.g., due to partial obstruction of imaging sensor(s) 110, obstacles in a field of view thereof, etc.), these missing data values may be completed with corresponding predetermined data values of predetermined model 142. In this manner, 3D model 122 may provide various points of view of at least a portion of the specified region (e.g., when rendered) and is not limited to a single point defined by, for example, an orientation of the aerial platform and/or imaging sensor(s) 112.

In some embodiments, one or more data values of 3D model 122 may be replaced with corresponding one or more predetermined data values of predetermined model 142. For example, if one or more of the data values of 3D model 122 has low quality (e.g., as compared to a predetermined data values quality or other data values of 3D model 122, etc.), these data values may be replaced by corresponding predetermined data values of predetermined model 142.

In some embodiments, one or more data values of 3D model 122 may be replaced with corresponding one or more weighted data values. Each of the weighted data values may, for example, include corresponding weighted data value of 3D model 122 and corresponding weighted predetermined data value of predetermined model 142. For example, if one or more of the data values of 3D model 122 has low quality, these data values may be replaced by the corresponding weighted data values, wherein the weight of the predetermined data values may be larger than the weight of the data values.

In various embodiments, at least a portion of predetermined model 142 may be updated or modified based on at least a portion of 3D model 122 (e.g., as described above).

According to some embodiments, 3D model determination module 120 may receive a real-time model 82 generatable based on readings of one or more real-time sensors 80 disposed on the aerial platform. In some other embodiments, 3D model determination module 120 may in communication with real-time sensor(s) 80 and may generate real-time model 82 based on readings of real-time sensor(s) 80. In some other embodiments, system 100 may include real-time sensor(s) 80. Real-time sensor(s) 80 may, for example, include sensors like LIDAR, radar and/or a combination of the sensors thereof.

Real-time model 82 may include a set of real-time data values that may provide a representation of at least a portion of the specified region. In various embodiments, 3D model determination module 120 determine, update or modify at least a portion of 3D model 122 further based on at least a portion of real-time model 82 (e.g., in a similar way as described above with respect to predetermined model 142).

For example, at least a portion of 3D model 122 may be completed with one or more real-time data values of real-time model 82. In another example, one or more data values of 3D model 122 may be replaced with corresponding one or more real-time data values of real-time model 82. In another example, one or more data values of 3D model 122 may be replaced by corresponding one or more weighted data values, wherein each of the weighted data values may, for example, include corresponding weighted data value of 3D model 122 and corresponding weighted real-time data value of real-time model 82.

In another example, 3D model determination module may determine 3D model 122 based on images 112 obtained using imaging sensor(s) 110, detect a reduction of quality of the data values of 3D model 122 below a specified threshold and replace the data values of 3D model 122 with the real-time data values of real-time model 82. For example, during the flight of the aerial platform, 3D model determination module 120 may determine 3D model 120 based on imaging sensor(s) 110. When approaching, for example, a landing site, the aerial platform may sweep up dust which may lead to a reduced visibility and thus to reduced quality of images 112 obtained by imaging sensor(s) 110 and to reduced quality of the data values of 3D model 122. Upon detection of the reduction in quality, 3D model determination module 120 may replace the data values of 3D model 122 with the real-time data values of real-time model 82 (e.g., from a radar, etc.).

According to some embodiments, system 100 may include a line of sight (LOS) tracking device 130. LOS tracking device 130 may be in communication with 3D model determination module 120 and with rendering module 170.

LOS tracking device 130 may track a LOS of a user of the aerial platform with respect to the specified region. In some embodiments, 3D model determination module 120 may determine 3D model 122 according to the tracked LOS of the user. For example, 3D model 122 may be determined to include a higher density of data values that represent a predetermined region of interest (ROI) around a LOS point at which the LOS of the user intersects the specified region of the terrain as compared to density of data values that represent other portions of the specified region.

According to some embodiments, system 100 may include a geolocation anchoring module 150. Geolocation anchoring module 150 may be in communication with 3D rendering model 120 and with database 140.

Geolocation anchoring module 150 may determine a real-world geographic location of the aerial platform based on 3D model 122 and predetermined model 142. For example, geolocation anchoring module 150 may compare at least some of the data values of 3D model 122 with at least some of the predetermined data values of predetermined model 142 and identify a subset of the data values and a subset of the predetermined data values that correspond to each other. As the real-world geographic location of at least some of the predetermined data values of predetermined model 142 may be known, geolocation module 150 may determine the real-world geographic location of the aerial platform based on the identified subsets of the data values and the predetermined data values.

In some embodiments, geolocation anchoring module 150 may determine a real-world geographic orientation of the aerial platform based on 3D model 122 and predetermined model 142.

In some embodiments, geolocation anchoring module 150 may update a real-world geographic location of the aerial platform obtainable by a geolocation sensor (e.g., GPS, etc.) of the aerial platform based on the determined real-world geographic location to yield an updated real-world geographic location.

According to some embodiments, system 100 may include a flight instructions determination module 160. Flight instructions determination module 160 may be in communication with 3D model determination module 120 and with geolocation anchoring module 150. Flight instructions module 160 may determine flight instructions 162 based on 3D model 122 and based on the determined, updated or obtained real-world geographic location of the aerial platform. Flight instructions 162 may, for example, include collision alerts, landing instructions, terrain flight instructions, etc. For example, flight instructions 162 may be sound instructions, visual instructions, vibration-based instructions, etc.

According to some embodiments, system 100 may include a rendering module 170. Rendering module 170 may be in communication with 3D model determination module 120 and geolocation module 150. Rendering module 170 may render at least a portion of 3D model 122 to yield one or more rendered frames 172.

In some embodiments, rendering module 170 may render a portion of 3D model 122 according to at least one of: the determined or updated real-time geographic location of the aerial platform (e.g., as determined or updated by geolocation anchoring module 150) or obtained real-time geographic location of the aerial platform (e.g., as obtained by the geolocation sensor(s) of the aerial platform). For example, rendering module 170 may render only a portion of model 142 that represents a predetermined region around the determined/updated/obtained real-world geographic location of the aerial platform.

In some embodiments, rendering module 170 may render at least a portion of 3D model 122 according to at least one of: the determined real-world geographic orientation and obtained real-world geographic orientation (e.g., obtained by a source external to system 100) of the aerial platform and with respect to the specified region in the terrain. For example, 3D model 122 may be rotated and rendered such that rendered frame(s) 172 may represent the specified region (or a portion thereof) in accordance with the actual orientation of the aerial platform.

In some embodiments, rendering module 170 may render at least a portion of 3D model 122 according to a specified point-of-view. The specified point-of-view may be defined by the user of system 100. For example, 3D model 122 may be rotated and rendered such that rendered frame(s) 172 may represent the specified point-of-view (or a portion thereof) as defined by the user. For example, the user may define the specified point-of-view of 180 degrees relative to the aerial platform, which may allow the user to observe, for example, the landing site from the orientation the aerial platform will approach the landing site thereof.

The rendering of 3D model 122 may be managed based on, for example, available computational resources.

In some embodiments, rendering module 170 may render 3D model 122 based on the LOS of the user. The LOS of the user may be tracked by LOS tracking device 130 (e.g., as described hereinabove). In some embodiments, LOS tracking device 130 may calculate (e.g., based on dynamics of change of the LOS of the user) a LOS prediction indicative of the LOS of the user in a subsequent time interval. Rendering module 170 may render at least a portion of 3D model 122 based on the LOS prediction such that rendered frame(s) 172 may represent the specified region (or a portion thereof) in accordance with the LOS prediction thereof.

According to some embodiments, system 100 may include a classification module 180. Classification module 180 may be in communication with 3D model determination module 120, flight instructions determination module 160 and rendering module 170. Classification module 180 may analyze at least a portion of data values of 3D model 122 based on a predetermined classification dataset and provide one or more classified subsets 182 of data values of 3D model 122. Classified subset(s) 182 may be accompanied with, for example, classification label(s). The classification label(s) may, for example, describe a type of an object represented by the respective subset(s) (e.g., car, building, etc.).

In some embodiments, rendering module 170 may render at least a portion of 3D model 122 according to classified subset(s) 182 and according to a predetermined set of classifying-rendering rules. For example, one or more of classified subset(s) 182 may be presented as semantic representation rather than a detailed representation thereof in rendered frame(s) 172. For example, if a classified subset of data values represents a tree, this classified subset may be presented as a general conus in rendered frame(s) 172 instead of a detailed representation of this particular tree. In another example, if a classified subset of data values represents a building, it may be presented as a general cube in rendered frame(s) 172 instead of detailed representation of this particular building.

In some embodiments, flight instructions determination module 160 may determine flight instructions 162 based on classified subset(s) 182 of data values. For example, flight instructions determined based on classified subset(s) 182 of data values may be more comprehensive as compared to, for example, flight instructions determined merely based on 3D model 122 as classified subset(s) 182 may provide enhanced understanding and/or interpretation of the 3D model.

In some embodiments, geolocation anchoring module 150 may filter 3D model 122 based on classified subset(s) 182 of data values to provide a filtered 3D model. For example, geolocation anchoring module 150 may remove data values relating to temporal objects (e.g., such as vehicles, humans, etc., as defined by classified subset(s) 182) such that the filtered 3D model includes data values relating to at least one of the terrain and permanent objects (e.g., buildings, etc.). Geolocation anchoring module 150 may register the filtered 3D model with predetermined model 142 and further determine the real-world geographic location and/or orientation of the aerial platform based on the registration. Registration of the filtered 3D model with predetermined model 142 may be more precious than registration of, for example, 3D model 122 with the predetermined model.

According to some embodiments, system 100 may include a control module 190. Control module 190 may be in communication with rendering module 170 and with flight instructions module 160.

Control module 190 may receive a notification that landing and/or terrain flight assistance is required. The notification may be received from the aerial platform or any other source. The notification may be due to, for example, a detected reduction in visibility conditions in a vicinity of the aerial platform. The reduction in visibility conditions may be due to, for example, weather conditions or may be induced by the aerial platform itself (e.g., helicopter during landing, etc.).

In some embodiments, upon receipt of the notification, control module 190 may control rendering module 170 to render at least a portion of 3D model 122 to provide rendered frame(s) 172.

In some embodiments, control module 190 may control rendering module 170 to render at least a portion of 3D model 122 determined at a specified preceding time interval (e.g., rather than real-time, or substantially real-time, 3D model). For example, control module 190 may control rendering module 170 to render a 3D model that has been determined few minutes ago or few days ago. The specified preceding time interval may be defined by, for example, the user of system 100.

In some embodiments, upon receipt of the notification, control module 190 may display rendered frame(s) 172 on one or more displays 70. In some embodiments, rendered frame(s) 172 being displayed on display(s) 70 may be accompanied/enhanced with flight instructions 162.

Display(s) 70 may include display(s) disposed in the aerial platform, head-mounted display(s) or display(s) disposed at any remote location (e.g., such as in a control center, etc.). In some embodiments, system 100 may include one or more displays (such as display(s) 70).

As would be apparent to those of ordinary skill in the art, each module/database of system 100 may be implemented on its own computing device, a single computing device, or a combination of computing devices. The communication between the modules/database of system 100 can be wired and/or wireless.

According to some embodiments, system 100 may include a drone. The drone may include one or more imaging sensors (e.g., like imaging sensor(s) 110). The drone may be carried by the aerial platform. The drone may be deployed from the aerial platform and used as a remote imaging sensor that does not generate (or substantially does generate) noise and/or does not sweep up (or substantially does not sweep up) dust.

For example, the drone may be deployed from a helicopter (e.g., aerial platform) towards a landing site. The drone may obtain images (e.g., real-time images) of the landing site (e.g., from different perspectives/orientations). The drone may transmit the obtained images to 3D model generation module 120 of system 100 that may determine 3D model 122 based on the images obtained by the drone.

In some embodiments, the drone may include a processing unit. The drone's processing unit may determine 3D model 122, or a portion thereof, and transmit the 3D model thereof to system 100.

Figure 2:
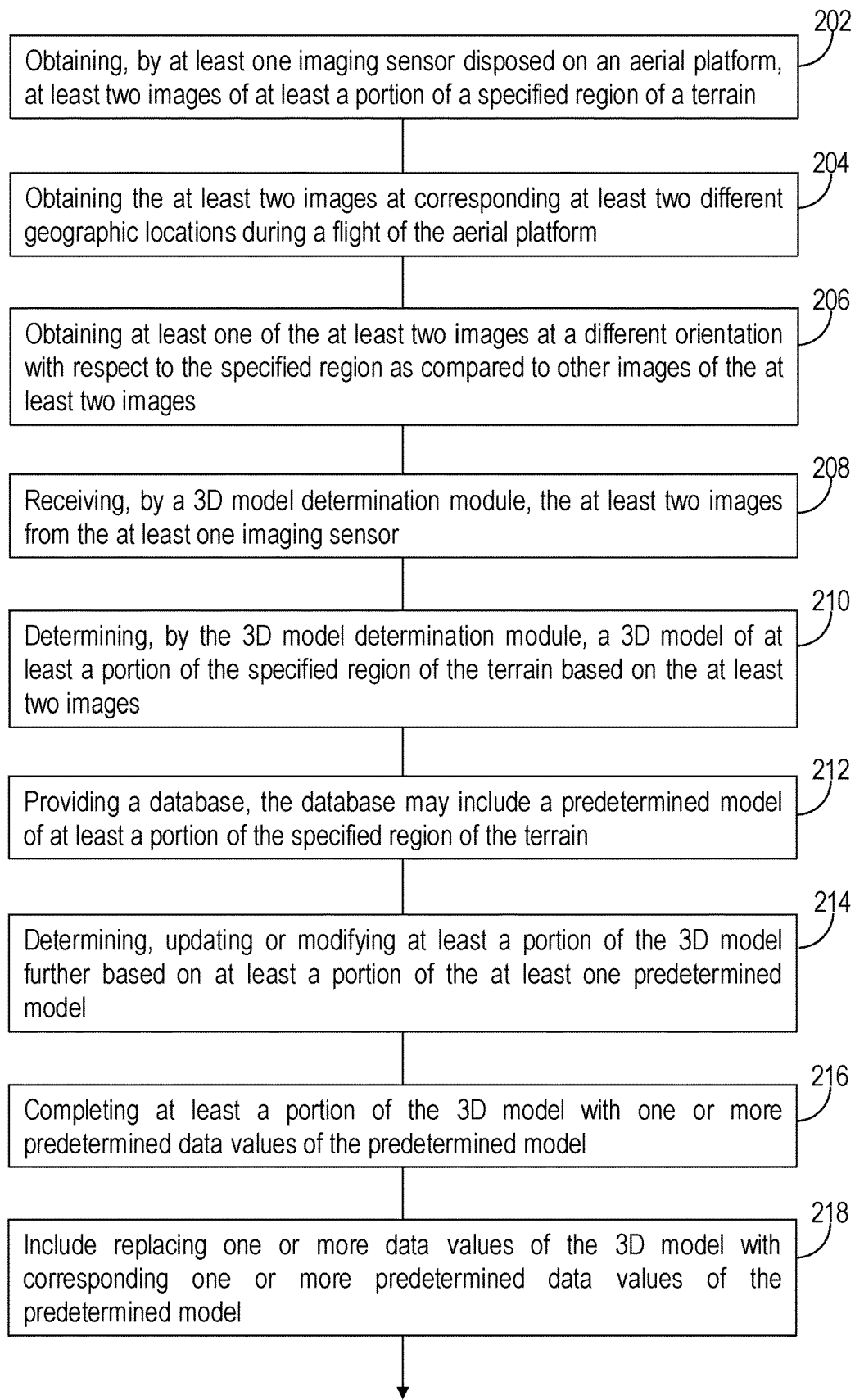
FIG. 2 is a flowchart of a method of landing and terrain flight assistance, according to some embodiments of the invention.

Reference is now made to FIG. 2, which is a flowchart of a method of landing and terrain flight assistance, according to some embodiments of the invention.

The method may be implemented by a system for landing and terrain flight assistance (such as system 100), which may be configured to implement the method. It is noted that the method is not limited to the flowcharts illustrated in FIG. 2 and to the corresponding description. For example, in various embodiments, the method needs not move through each illustrated box or stage, or in exactly the same order as illustrated and described.

Some embodiments may include obtaining, by at least one imaging sensor disposed on an aerial platform, at least two images of at least a portion of a specified region of a terrain (step 202). For example, imaging sensor(s) 110 and images 112 described above with respect to FIG. 1.

Some embodiments may include obtaining the at least two images at corresponding at least two different geographic locations during a flight of the aerial platform (step 204). For example, as described above with respect to FIG. 1.

Some embodiments may include obtaining at least one of the at least two images at a different orientation with respect to the specified region as compared to other images of the at least two images (step 206). For example, as described above with respect to FIG. 1.

Some embodiments may include receiving, by a 3D model determination module, the at least two images from the at least one imaging sensor (step 208). For example, 3D model determination module 120 described above with respect to FIG. 1.

Some embodiments may include determining, by the 3D model determination module, a 3D model of at least a portion of the specified region of the terrain based on the at least two images, the 3D model may include a set of data values that may provide a 3D representation of at least a portion of the specified region (step 210). For example, as described above with respect to FIG. 1.

Some embodiments may include providing a database, the database may include a predetermined model of at least a portion of the specified region of the terrain, the predetermined model may include a set of predetermined data values that may provide a representation of at least a portion of the specified region, a real-world geographic location of at least some of the predetermined data values may be known (step 212). For example, database 140 and predetermined model 142 as described above with respect to FIG. 1. For example, the predetermined model may include predetermined 3D datasets that may provide a 3D representation of at least a portion of the specified region, more predetermined two-dimensional (2D) datasets that may provide a 2D representation of at least a portion of the specified region and/or a combination thereof.

Various embodiments may include determining, updating or modifying at least a portion of the 3D model further based on at least a portion of the at least one predetermined model (step 214). For example, as described above with respect to FIG. 1.

Some embodiments may include completing at least a portion of the 3D model with one or more predetermined data values of the predetermined model (step 216). For example, as described above with respect to FIG. 1. For example, if the 3D model determined based on the images is missing one or more data values that should represent a portion of the specified region (e.g., due to partial obstruction of the imaging sensor(s), obstacles in a field of view thereof, etc.), these missing data values may be completed with corresponding predetermined data values of the predetermined model. In this manner, the 3D model may provide various points of view of at least a portion of the specified region (e.g., when rendered) and is not limited to a single point defined by, for example, an orientation of the aerial platform and/or the imaging sensor(s).

Some embodiments may include replacing one or more data values of the 3D model with corresponding one or more predetermined data values of the predetermined model (step 218). For example, as described above with respect to FIG. 1. For example, if one or more of the data values of the 3D model has low quality (e.g., as compared to a predetermined data values quality or other data values of the 3D model, etc.), these data values may be replaced by corresponding predetermined data values of the predetermined model.

Some embodiments may include replacing one or more data values of the 3D model with corresponding one or more weighted data values, each of the weighted data values may include corresponding weighted data value of the 3D model and corresponding weighted predetermined data value of the predetermined model (step 220). For example, as described above with respect to FIG. 1. For example, if one or more of the data values of the 3D model has low quality, these data values may be replaced by the corresponding weighted data values, wherein the weight of the predetermined data values may be larger than the weight of the data values.

Various embodiments may include updating or modifying at least a portion of the predetermined model based on at least a portion of the 3D model (step 222). For example, as described above with respect to FIG. 1.

Some embodiments may include receiving, by the 3D model determination module, a real-time model generatable based on readings of one or more real-time sensors disposed on the aerial platform, the real-time model may include a set of real-time data values that may provide a representation of at least a portion of the specified region (step 224). For example, real-time sensor(s) 80 and real-time model 82 described above with respect to FIG. 1.

Some embodiments may include determining, by the 3D model determination module, the real-time model based on readings of the one or more real-time sensors (step 226). For example, as described above with respect to FIG. 1.

Various embodiments may include determining, updating or modifying at least a portion of the 3D model further based on at least a portion of the real-time model (step 228). For example, as described above with respect to FIG. 1.

Some embodiments may include completing at least a portion of the 3D model with one or more real-time data values of the real-time model (step 230). For example, as described above with respect to FIG. 1.

Some embodiments may include replacing one or more data values of the 3D model with corresponding one or more real-time data values of the real-time model (step 232). For example, as described above with respect to FIG. 1. For example, the 3D model be determined based on the images obtained using the imaging sensor(s), and once a reduction of quality of the data values of the 3D model below a specified threshold is detected the data values of the 3D model may be replaced with the real-time data values of the real-time model. For example, during the flight of the aerial platform, the 3D model may be determined based on the imaging sensor(s) 110. When approaching, for example, a landing site, the aerial platform may sweep up dust which may lead to a reduced visibility and thus to reduced quality of the images obtained by the imaging sensor(s) 110 and to reduced quality of the data values of the 3D model. Upon detection of the reduction in quality, the data values of the 3D model may be replaced with the real-time data values of the real-time model (e.g., from a radar, etc.).

Some embodiments may include replacing one or more data values of the 3D model with corresponding one or more weighted data values, each of the weighted data values may include corresponding weighted data value of the 3D model and corresponding weighted real-time data value of the real-time model (step 234). For example, as described above with respect to FIG. 1.

Some embodiments may include tracking line of sight (LOS) of a user of the aerial platform with respect to the specified region using a LOS tracking device (step 236). For example, LOS tracking device 130 described above with respect to FIG. 1.

Some embodiments may include determining the 3D model according to the tracked LOS of the user (step 238). For example, as described above with respect to FIG. 1.

Some embodiments may include determining the 3D model such that the 3D model includes a higher density of data values that represent a predetermined region of interest (ROI) around a LOS point at which the LOS of the user intersects the specified region of the terrain as compared to density of data values that represent other portions of the specified region (step 240). For example, as described above with respect to FIG. 1.

Some embodiments may include determining, by geolocation anchoring module, a real-world geographic location of the aerial platform based on the 3D model and the predetermined model (step 242). For example, geolocation choiring module 150 described above with respect to FIG. 1.

Some embodiments may include comparing at least some of the data values of the 3D model with at least some of the predetermined data values of predetermined model 142 and identify a subset of the data values and a subset of the predetermined data values that correspond to each other (step 244). For example, as described above with respect to FIG. 1.

Some embodiments may include determining the real-world geographic location of the aerial platform based on the identified subsets of the data values and the predetermined data values (step 246). For example, as described above with respect to FIG. 1.

Some embodiments may include determining a real-world geographic orientation of the aerial platform based on the identified subsets of the data values and the predetermined data values (step 247).

Some embodiments may include updating a real-world geographic location of the aerial platform obtainable by a geolocation sensor of the aerial platform based on the determined real-world geographic location to yield an updated real-world geographic location (step 248). For example, as described above with respect to FIG. 1.

Various embodiments may include generating, by a flight instructions module, flight instructions based on the 3D model and based on the determined, updated or obtained real-world geographic location of the aerial platform (step 250). For example, flight instruction module 150 and flight instructions 152 described above with respect to FIG. 1.

Some embodiments may include rendering, by a rendering module, at least a portion of the 3D model to yield one or more rendered frames (step 252). For example, rendering module 170 and rendered frame(s) 172 described above with respect to FIG. 1.

Some embodiments may include rendering a portion of the 3D model according to at least one of: the determined, updated and obtained real-time geographic location of the aerial platform (step 254). For example, as described above with respect to FIG. 1.

Some embodiments may include rendering at least a portion of the 3D model according to at least one of: the determined or obtained real-world geographic orientation of the aerial platform with respect to the specified region in the terrain (step 256). For example, as described above with respect to FIG. 1.

Some embodiments may include rendering at least a portion of the 3D model according to a specified point-of-view defined by the user (stage 257). For example, as described above with respect to FIG. 1.

Some embodiments may include managing the rendering of at least a portion of the 3D model further according to available computational resources (step 258). For example, as described above with respect to FIG. 1.

Some embodiments may include rendering at least a portion of a 3D model determined at a specified preceding time interval (stage 259). For example, the user may select to render a 3D model that has been determined few minutes ago or few days ago.

Some embodiments may include rendering at least a portion of the 3D model further based on the LOS of the user (step 260). For example, as described above with respect to FIG. 1.

Some embodiments may include calculating, based on based on dynamics of change of the LOS of the user, a LOS prediction indicative of the LOS of the user in a specific subsequent time interval and rendering at least a portion of the 3D model based on the LOS prediction (stage 261). For example, as described above with respect to FIG. 1.

Some embodiments may include analyzing, by a classification module, at least a portion of data values of the 3D model based on a predetermined classification dataset and providing one or more classified subsets of data values of the 3D model (step 262). For example, classification module 180 and classified dataset(s) 182 described above with respect to FIG. 1.

Some embodiments may include rendering, by the rendering module, at least a portion of the 3D model according to the one or more classified subsets and according to a predetermined set of classifying-rendering rules (step 264). For example, as described above with respect to FIG. 1.

Some embodiments may include presenting at least one of the one or more classified subsets of data values as a semantic representation of an object represented by the respective classified dataset (stage 265). For example, one or more of the classified subset(s) may be presented as semantic representation rather than a detailed representation thereof in the rendered frame(s). For example, if a classified subset of data values represents a tree, this classified subset may be presented as a general conus in the rendered frame(s) instead of a detailed representation of this particular tree. In another example, if a classified subset of data values represents a building, it may be presented as a general cube in the rendered frame(s) instead of detailed representation of this particular building.

Some embodiments may include determining the flight instructions based on the one or more classified subsets of data values (stage 266). For example, flight instructions determined based on the one or more classified subsets of data values may be more comprehensive as compared to, for example, flight instructions determined merely based on the 3D model as the classified subset(s) may provide enhanced understanding and/or interpretation of the 3D model (e.g., as described above with respect to FIG. 1).

Some embodiments may include filtering the 3D model based on the one or more classified subsets of data values to provide a filtered 3D model, registering the filtered 3D model with the predetermined model and determining the real-world geographic location and/or orientation of the aerial platform based on the registration (stage 268). For example, the filtered 3D model may include data values relating to at least one of the terrain and permanent objects (e.g., buildings, etc.) while data values relating to temporal objects (e.g., such as vehicles, humans, etc., as defined by the classified subset(s)) may be filtered from the 3D model (e.g., as described above with respect to FIG. 1).

Some embodiments may include receiving, by a control module, a notification that landing and/or terrain flight assistance is required (step 270). For example, control module 190 described above with respect to FIG. 1.

Some embodiments may include rendering of at least a portion of the 3D model upon receipt of the notification (step 272). For example, as described above with respect to FIG. 1.

Some embodiments may include displaying, one or more displays, the one or more rendered frames (step 274). For example, as described above with respect to FIG. 1.

Advantageously, the disclosed system and method may enable to determine a 3D model of at least a portion of a specified region of a terrain, determine a real-world geographic location of an aerial platform and determine flight instructions (e.g., including landing and/or terrain flight instructions) based on one or more passive sensors and one or more predetermined models of at least a portion of the terrain. Accordingly, the disclosed system and method may eliminate a need in active sensors, thus making it hard to reveal the location of the aerial platform.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of providing a computer-assisted landing and terrain flight assistance, the method comprising:
    obtaining, by an imaging sensor disposed on an aerial platform, at least two images of at least a portion of a specified region of a terrain when the aerial platform is at corresponding at least two different geographic locations;
    tracking a line of sight (LOS) of a user of the aerial platform with respect to the specified region using a LOS tracking device;
    determining, based on the at least two images, a 3D model comprising a set of data values that provide a 3D representation of at least a portion of the specified region, wherein the 3D model is determined according to the tracked LOS of the user;
    analyzing, by a computer processor, at least a portion of data values of the 3D model based on a predetermined classification dataset to provide one or more classified subsets of data values of the 3D model;
    filtering, by a geolocation anchoring module, on the computer processor, the 3D model based on classified subsets of data values to provide a filtered 3D model, wherein said filtering comprises removing, by the geolocation anchoring module, data values of temporal objects, wherein said data values of temporal objects are removed based on dynamics of change of the tracked LOS of the user;
    receiving a predetermined model comprising a set of predetermined data values that provide a representation of at least a portion of the specified region, wherein real-world geographic locations of at least some of the predetermined data values are known;
    comparing, by the computer processor, at least a portion of the filtered 3D model and at least a portion of the predetermined model;
    determining a real-world geographic location of the aerial platform based on the comparison of at least a portion of the filtered 3D model and at least a portion of the predetermined model;
    determining flight instructions based on the filtered 3D model and the determined real-world geographic location of the aerial platform;
    updating, by the computer processor, one or more data values of the filtered 3D model with corresponding one or more data values of the pre-determined model upon detection of a reduction of a quality of the one or more data values of the filtered 3D model; and
    displaying, by the computer processor, the updated filtered 3D model on a display.

2. The method of claim 1, further comprising obtaining at least one of the at least two images at a different orientation with respect to the specified region as compared to at least one another image of the at least two images.

3. The method of claim 1, wherein the updating comprises at least one of:
    completing one or more missing data values of the 3D model with one or more predetermined data values of the predetermined model;
    replacing one or more data values of the 3D model with corresponding one or more predetermined data values of the predetermined model; and
    replacing one or more data values of the 3D model with corresponding one or more weighted data values, each of the weighted data values comprises corresponding weighted data value of the 3D model and corresponding weighted predetermined data value of the predetermined model.

4. The method of claim 1, comprising updating at least a portion of the predetermined model based on at least a portion of the 3D model.

5. The method of claim 1, further comprising:
    receiving a real-time model generatable based on readings of one or more real-time sensors disposed on the aerial platform, the real-time model comprises a set of real-time data values that provide a representation of at least a portion of the specified region; and updating at least a portion of the 3D model based on at least a portion of the real-time model.

6. The method of claim 5, wherein the one or more real-time sensors comprises at least one of a radar and LIDAR.

7. The method of claim 5, wherein the updating comprises at least one of:
completing one or more missing data values of the 3D model with one or more real-time data values of the real-time model;
replacing one or more data values of the 3D model with corresponding one or more real-time data values of the real-time model; and
replacing one or more data values of the 3D model with corresponding one or more weighted data values, each of the weighted data values comprises corresponding weighted data value of the 3D model and corresponding weighted real-time data value of the real-time model.

8. The method of claim 7, wherein the replacing is upon detection of a reduction of a quality of the one or more data values of the 3D model.

9. The method of claim 1, further comprising determining the 3D model to include a higher density of data values that represent a predetermined region of interest (ROI) around a LOS point at which the LOS of the user intersects the specified region of the terrain as compared to density of data values that represent other portions of the specified region.

10. The method of claim 1, further comprising rendering at least a portion of the 3D model to yield one or more rendered frames.

11. The method of claim 10, further comprising rendering at least a portion of the 3D model according to at least one of:
the determined real-world geographic location of the aerial platform; and
a specified point-of view defined by a user.

12. The method of claim 10, further comprising:
calculating, based on dynamics of change of the LOS of the user, a LOS prediction indicative of the LOS of the user in a subsequent time interval; and
rendering at least a portion of the 3D model based on the LOS prediction.

13. The method of claim 10, further comprising rendering at least a portion of a 3D model that has been determined at a specified preceding time interval.

14. The method of claim 1, further comprising rendering at least a portion of the 3D model according to the one or more classified subsets and according to a predetermined set of classifying-rendering rules to provide one or more rendered frames.

15. The method of claim 14, further comprising presenting at least one of the one or more classified subsets of data values as a semantic representation of an object represented by the respective classified dataset.

16. A computer-assisted system for landing and terrain flight assistance, the system comprising:
an imaging sensor adapted to be disposed on an aerial platform and adapted to obtain at least two images of at least a portion of a specified region of a terrain when the aerial platform is at corresponding at least two different geographic locations;
a geolocation anchoring module;
a line of sight (LOS) tracking device adapted to track a LOS of a user of the aerial platform with respect to the specified region; and
a processing unit configured to:
receive the at least two images;
determine, based on the at least two images, a 3D model comprising a set of data values that provide a 3D representation of at least a portion of the specified region, wherein the 3D model is determined according to the tracked LOS of the user;
analyze at least a portion of data values of the 3D model based on a predetermined classification dataset to provide one or more classified subsets of data values of the 3D model;
filter, by the geolocation anchoring module, the 3D model based on classified subsets of data values to provide a filtered 3D model, comprising the removal of data values of temporal objects by the geolocation anchoring module, wherein said removal of data values of temporal objects is based on dynamics of change of the tracked LOS of the user;
receive a predetermined model comprising a set of predetermined data values that provide a representation of at least a portion of the specified region, real-world geographic locations of at least some of the predetermined data values are known;
compare at least a portion of the filtered 3D model and at least a portion of the predetermined model;
determine a real-world geographic location of the aerial platform based on the comparison of at least a portion of the filtered 3D model and at least a portion of the predetermined model;
determine flight instructions based on the filtered 3D model and the determined real-world geographic location of the aerial platform;
update one or more data values of the filtered 3D model with corresponding one or more data values of the pre-determined model upon detection of a reduction of a quality of the one or more data values of the filtered 3D model; and
displaying by the computer processor, the updated filtered 3D model on a display.

* * * * *